Dec. 27, 1949     D. C. BEATTY     2,492,679

ROAD SIGN WITH LOCATION INDICATOR

Filed Sept. 17, 1945

D. C. Beatty

INVENTOR.

BY

ATTORNEYS.

Patented Dec. 27, 1949

2,492,679

UNITED STATES PATENT OFFICE 2,492,679

ROAD SIGN WITH LOCATION INDICATOR

Donald C. Beatty, near Media, Pa.

Application September 17, 1945, Serial No. 616,725

1 Claim. (Cl. 40—125)

This invention relates to signs designed for use at predetermined intervals along the sides of roads and it is an object of the invention to provide a sign each one of which will indicate to the passing driver his approximate location between his point of starting and his destination, and the approximate time required to travel from that point to the destination at the maximum speed allowed.

It is a fact well known to those experienced in driving that it is very desirable at times to know how long it will take to reach a destination and while various types of maps have been published for use by drivers on which mileage has been indicated, and road signs have been erected indicating mileage, no means have heretofore been devised whereby the driver, by glancing at road signs, can ascertain his exact position and the time required to reach his destination.

An object of the present invention is to provide a roadside map which will be substantially the same at all points between the indicating terminals but which is provided with a position indicator which can be placed at any selected point on the displayed map to inform a driver of his exact location.

It is a further object to display on or adjacent to the indicator information concerning the time required to drive to the destination.

It is a still further object to provide on the road indicating portion of the map contrasting colors which converge to the indicator on the map so that the eyes of the driver passing the map are focussed immediately on the indicator.

A still further object is to provide the road indicating portion of the map with opposed series of reflectors of contrasting colors which converge toward the indicating element and also serve to focus the attention of the passing driver on the indicator whether driving during the night or day.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred forms of the invention have been shown.

Figure 1:
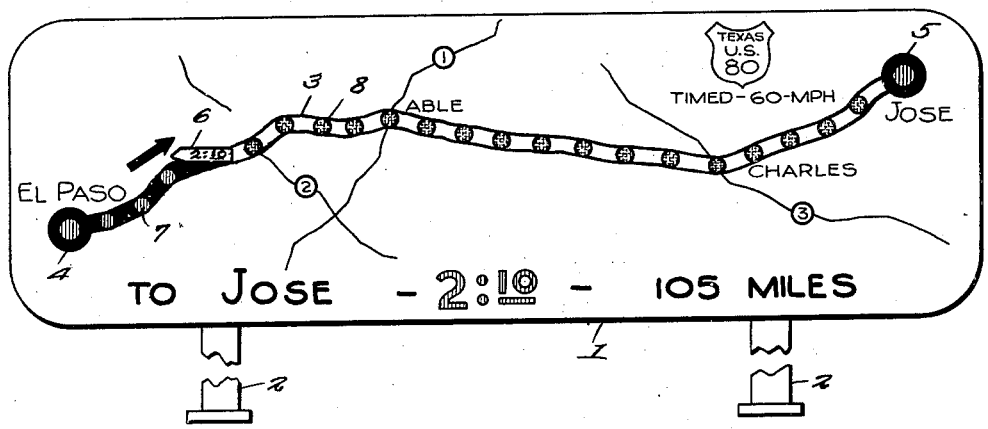
Figure 1 is a front elevation of one form of roadside map.

Referring to the figures by characters of reference, 1 designates the body or panel portion of the sign which can be supported in any suitable manner, as by one or more standards 2. Extending lengthwise of the panel is an exaggerated portrayal 3 of the road adjacent to which the sign is erected, a point of starting 4, and a destination 5, constituting the terminals of the indicated road 3. There can also be displayed on the panel natural or other landmarks to be found between said terminals.

A number of these signs, all of the same appearance, are to be erected along the designated road at desired intervals and the usual data can be displayed on each sign, such as the number of the highway, the speed limit, the names of the point of starting and the destination, the names of intermediate points, etc.

The primary purpose of the invention is to indicate to the passing driver the time which it will take under normal driving conditions to reach the indicated destination 5. Therefore each sign is equipped with an indicator in the form of a cross bar 6 of any desired proportions and this indicator is located at that point on the displayed map at which the map is located. In other words, if the sign is located at a point sixty miles from the destination the indicator will appear on the map at a point representing sixty miles from the destination. If the sign is located at a point twenty-five miles from the destination the indicator will be displayed on the map at a point representing twenty-five miles from the destination. This procedure is followed at desired intervals throughout the distance between the terminals of the road represented by the displayed map and by glancing at each sign as he passes the motorist can readily determine his position relative to the terminals.

A further and primary advantage is present by reason of the fact that the sign is not used primarily to indicate mileage to the traveller but gives information as to the estimated time it will take to drive from any designated point to the destination 5. For example, if one of the indicators displayed on the map is located at a point where, under correct driving conditions, it will take one hour, fifty minutes to reach the displayed designation 5, the data "1:50" or any other suitable display of the information will be located on the sign where it can be viewed readily by the passing motorist. It is intended to display this data on the indicator 6 and in order that the attention of the passing motorist may be focused immediately upon the indicator, that portion of the road map on the sign leading from the point of starting, 4, to the indicator 6 can be of a color in striking contrast to the color of the remaining portion of the map which leads from the indicated designation 5.

As a further means of focusing the attention of the passing motorist to the indicator 6, a series of reflectors 7 of one color such as red can be arranged on that portion of the map leading from the terminal 4 to the indicator 6. While reflectors 8 of a contrasting color, such as amber, can be located on that portion of the map leading from the indicator 6 to the terminal 5.

Obviously with signs all of the same appearance with the exception of differently located indicators 6 and differences in the lengths of the displays along the map of the road, they can be set up readily at the selected points along the road so that the indications displayed thereon will agree accurately with the locations of the signs, and, as a result, the passing motorist can readily and accurately determine, while passing each sign, not only his geographical location but also the estimated time required to reach his destination.

In addition to the data supplying the driving time between each sign and the destination, each of the signs can also be provided with an indication of the number of miles still to be travelled.

Figure 2:
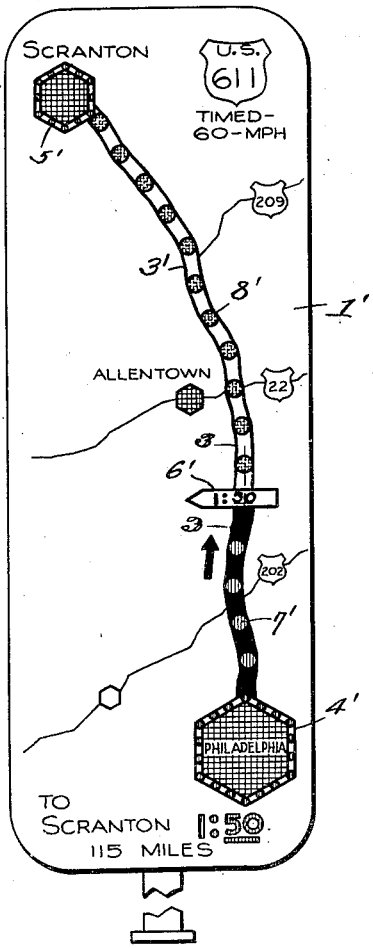
Figure 2 is an elevation of another form of the invention.
Figure 3:
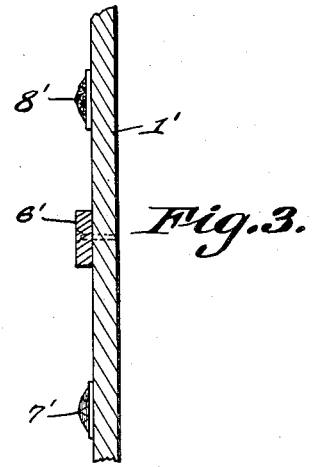
Figure 3 is an enlarged section on line 3—3, Fig. 2.

The map shown in Fig. 2 contains all of the elements described in connection with the map shown in Fig. 1 and those parts thereof corresponding with the parts 1 to 8 inclusive have been designated on Figs. 2 and 3 by the numerals 1' to 8' inclusive.

Suitable advertising matter can of course be associated with each sign and each sign can be of any desired shape, proportions and materials.

All of the signs to be set up along the road between two points can be made alike as the first step in production, and thereafter the indicators 6 or 6' can be placed on the road indicating a portion of each sign at those points indicating the locations where the signs are to be set up. The correct data can also be applied to each sign so as to conform with the position of the time indicator thereon. Thereafter the various signs can be conveyed to the road and set up at the respective points indicated by the time indicators.

What is claimed is:

A road sign including a panel having displayed thereon a map of a portion of a road extending between terminals relatively distant in miles from each other, said terminals designating a predetermined point of starting and a predetermined destination, means on the sign for indicating to a passing motorist the time required to reach the indicated destination from the point at which the sign is erected, those portions of the displayed road on the sign leading from the displayed terminals to the indicating means being in contrasting colors, and a series of reflectors on the indicated road between the respective indicated terminals and the time indicator, the reflectors of each series being of a color contrasting with that of the reflectors of the other series.

DONALD C. BEATTY.

REFERENCES CITED

The following references are of record in the file of this patent:

UNITED STATES PATENTS

| Number | Name | Date |
| --- | --- | --- |
| 770,350 | Carter | Sept. 20, 1904 |
| 1,737,520 | Richardson, Jr. | Nov. 26, 1929 |
| 1,821,227 | Mackey et al. | Sept. 1, 1931 |
| 1,995,856 | Luce | Mar. 26, 1935 |